US010778762B2

(12) United States Patent
Liang et al.

(10) Patent No.: US 10,778,762 B2
(45) Date of Patent: Sep. 15, 2020

(54) CLOUD COMPUTING SERVICE ARCHITECTURE (71) Applicant: Rancher Labs, Inc., Mountain View, CA (US)

(72) Inventors: Sheng Liang, Los Altos Hills, CA (US); Oleg Smolsky, Sunnyvale, CA (US)

(73) Assignee: Rancher Labs, Inc., Mountain View, CA (US)

( * ) Notice: Subject to any disclaimer, the term of this patent is extended or adjusted under 35 U.S.C. 154(b) by 507 days.

(21) Appl. No.: 15/132,041

(22) Filed: Apr. 18, 2016

(65) Prior Publication Data
US 2017/0302734 A1 Oct. 19, 2017

(51) Int. Cl.
*G06F 11/20* (2006.01)
*G06F 3/06* (2006.01)
*H04L 29/08* (2006.01)

(52) U.S. Cl.
CPC .......... *H04L 67/1095* (2013.01); *G06F 3/067* (2013.01); *G06F 11/2069* (2013.01); *H04L 67/1097* (2013.01); *G06F 11/2082* (2013.01); *G06F 2201/815* (2013.01); *G06F 2201/84* (2013.01)

(58) Field of Classification Search
CPC ............ G06F 11/2071; G06F 11/2069; G06F 11/2082; G06F 11/2064
See application file for complete search history.

(56) References Cited

U.S. PATENT DOCUMENTS

| 7,603,530 | B1 * | 10/2009 | Liikanen | G06F 11/2084 |
| | | | | 711/156 |
| 9,659,080 | B1 * | 5/2017 | Drobychev | H04L 67/1095 |
| 2002/0114341 | A1 * | 8/2002 | Sutherland | H04L 41/00 |
| | | | | 370/428 |
| 2007/0130213 | A1 * | 6/2007 | Jean-Denis | G06F 11/2064 |

\* cited by examiner

*Primary Examiner* — Jigar P Patel
(74) *Attorney, Agent, or Firm* — Fenwick & West LLP (57) ABSTRACT A service control system manages a set of storage clients operating within one or more computing hosts. Storage clients may access a consistent storage system regardless which cloud provider the computing hosts come from. To provide storage, each logical volume accessed by a container is associated with a microcontroller at the computing host. The microcontroller is managed by the service control system and stores data for the logical volume at two or more replicas on different computing hosts.

11 Claims, 6 Drawing Sheets

Slab 1

| Page | Seq. No. | Data |
|---|---|---|
| Page 1 | [0] | LBA: 0x0000 |
| Page 2 | [1] | LBA: 0x1000 |
| Page 3 | [2] | LBA: 0x2000 |
| Page 4 | | |
| Page 5 | | |
| Page 6 | | |

Slab 2

| Page | Seq. No. | Data |
|---|---|---|
| Page 1 | [10] | LBA: 0x3000 |
| Page 2 | | |
| Page 3 | | |
| Page 4 | | |
| Page 5 | | |
| Page 6 | | |

Read Index

| | |
|---|---|
| 0x0000 | Slab 1 Page 1 |
| 0x1000 | Slab 1 Page 2 |
| 0x2000 | Slab 1 Page 3 |
| 0x3000 | Slab 2 Page 1 |

FIG. 4B

Slab 1

| Page | Seq. No. | Data |
|---|---|---|
| Page 1 | [0] | LBA: 0x0000 |
| Page 2 | [1] | LBA: 0x1000 |
| Page 3 | [2] | LBA: 0x2000 |
| Page 4 | [11] | LBA: 0x4000 |
| Page 5 | | |
| Page 6 | | |

Slab 2

| Page | Seq. No. | Data |
|---|---|---|
| Page 1 | [10] | LBA: 0x3000 |
| Page 2 | | |
| Page 3 | | |
| Page 4 | | |
| Page 5 | | |
| Page 6 | | |

Read Index

| | |
|---|---|
| 0x0000 | Slab 1 Page 1 |
| 0x1000 | Slab 1 Page 2 |
| 0x2000 | Slab 1 Page 3 |
| 0x3000 | Slab 2 Page 1 |
| 0x4000 | Slab 1 Page 4 |

FIG. 4C

Slab 1

| Page | Seq. No. | Data |
|---|---|---|
| Page 1 | [0] | LBA: 0x0000 |
| Page 2 | | |
| Page 3 | [2] | LBA: 0x2000 |
| Page 4 | [11] | LBA: 0x4000 |
| Page 5 | [12] | LBA: 0x1000 |
| Page 6 | | |

Slab 2

| Page | Seq. No. | Data |
|---|---|---|
| Page 1 | [10] | LBA: 0x3000 |
| Page 2 | | |
| Page 3 | | |
| Page 4 | | |
| Page 5 | | |
| Page 6 | | |

Read Index

| | |
|---|---|
| 0x0000 | Slab 1 Page 1 |
| 0x1000 | Slab 1 Page 5 |
| 0x2000 | Slab 1 Page 3 |
| 0x3000 | Slab 2 Page 1 |
| 0x4000 | Slab 1 Page 4 |

FIG. 4D

Slab 1

| Page | Seq. No. | Data |
|---|---|---|
| Page 1 | [0] | LBA: 0x0000 |
| Page 2 | | |
| Page 3 | [2] | LBA: 0x2000 |
| Page 4 | [11] | LBA: 0x4000 |
| Page 5 | [12] | LBA: 0x1000 |
| Page 6 | [13] | Snapshot |

Slab 2

| Page | Seq. No. | Data |
|---|---|---|
| Page 1 | [10] | LBA: 0x3000 |
| Page 2 | [14] | LBA: 0x2000 |
| Page 3 | | |
| Page 4 | | |
| Page 5 | | |
| Page 6 | | |

Read Index

| | |
|---|---|
| 0x0000, snap 12 | Slab 1 Page 1 |
| 0x1000, snap 12 | Slab 1 Page 5 |
| 0x2000, snap 12 | Slab 1 Page 3 |
| 0x3000, snap 12 | Slab 2 Page 1 |
| 0x4000, snap 12 | Slab 1 Page 4 |
| 0x2000, live | Slab 2 Page 2 |

FIG. 4E

Slab 1

| Page | Seq. No. | Data |
|---|---|---|
| Page 1 | [0] | LBA: 0x0000 |
| Page 2 | | |
| Page 3 | | |
| Page 4 | [11] | LBA: 0x4000 |
| Page 5 | [12] | LBA: 0x1000 |
| Page 6 | | |

Slab 2

| Page | Seq. No. | Data |
|---|---|---|
| Page 1 | [10] | LBA: 0x3000 |
| Page 2 | [14] | LBA: 0x2000 |
| Page 3 | | |
| Page 4 | | |
| Page 5 | | |
| Page 6 | | |

Read Index

| | |
|---|---|
| 0x0000 | Slab 1 Page 1 |
| 0x1000 | Slab 1 Page 5 |
| 0x2000 | Slab 1 Page 3 |
| 0x3000 | Slab 2 Page 1 |
| 0x4000 | Slab 1 Page 4 |

CLOUD COMPUTING SERVICE ARCHITECTURE

BACKGROUND

This invention relates generally to managing distributed storage systems, and more particularly to distributed storage across multiple computing hosts.

In cloud computing architectures, computing hosts are provided for a subscriber by various cloud computing providers. A cloud computing provider operates a large assembly of physical computer systems, each with processor, memory, storage, and networking capabilities. The capabilities (equivalently, services) of these physical computer systems can be made available directly to uses as bare metal hosts or can be made available via virtualized host computers (aka Virtual Machines, or VMs), each with virtual processor, memory, storage, networking capabilities. A subscriber obtains access to some portion of overall services via some number of provisioned hosts. For example, a cloud computing provider may provide one or more computing hosts executing a Linux operating system for use by a subscriber.

Previous cloud computing systems typically provide data storage using a centralized controller. The centralized controller in these systems receives requests to store data from different types of storage clients, which include computing hosts, virtual machines, and containers, and determines where to store and retrieve data for these requests. This can create complex and complicated data management scenarios for the centralized controller, which must manage a large number of backend physical storage disks and its designer must grapple with storage bandwidth and speeds on the large number of backend physical storage disks. The centralized controller is at risk of defects that affect all systems accessing it, and updating the centralized controller can prevent access to the stored data for all systems during the update.

SUMMARY

A service control system manages storage services for storage resources and storage clients that spread across a number of distributed computing hosts. The computing hosts may be separated among one or more cloud computing providers such that the variety of different computing hosts may be controlled via the service control system despite being located at different cloud computing providers.

The computing hosts may include computer hosts at a cloud computing provider, as well as computing hosts operated by organizations that are not a part of a cloud computing architecture, such as a private server of the client. A computing host may be a physical server or a virtual machine. These computing hosts may operate virtual machines or containers. A computing host provides disk resources and a networking address (e.g., an IP address).

This services architecture permits the service control system to manage storage for storage clients at computing hosts with varying heterogeneous configurations (e.g., different types of physical machines and virtual machines) across multiple cloud providers. This service control may be used for the various computing hosts without relying on specific APIs of the cloud providers or provider-specific services from the cloud providers. The service control system may provide control of the computing hosts from beyond a cloud provider's network and may control computing hosts at several cloud providers. Storage services for each computing host may be managed by a storage "microcontroller" at each computing host that services the storage volumes consumed on each host. One storage microcontroller is provided for each storage volume associated with storage client, such as a container or virtual machine. The microcontroller manages requests to store data related to each logical storage volume accessed by the storage client, and directs storage of the logical volume to replicas that may be stored on one or more separate hosts. Thus, rather than route requests through a centralized system, each storage microcontroller manages replicas of the storage volumes itself. The data for each logical volume is replicated across the replicas, providing mirrored data across multiple computing hosts.

The service control system maintains a record of the capacity and mapping of logical storage volumes (and associated microcontrollers) to computing hosts storing replicas. When a storage microcontroller requests creation of a new replica (e.g., to correct a replica that has degraded) or manage designation of its replica, the service control system assigns a replica for the storage microcontroller based on the available capacity at various computing hosts.

Requests to store or retrieve data for a replica are sent from the storage microcontroller to a replica service endpoint executing at the destination computing host. Each replica service endpoint manages and stores data at physical disks on its computing host. The replicas may be stored on the same computing hosts running storage clients (known as a hyper-converged storage configuration) or may be stored on a dedicated set of computing hosts not used for running storage clients (known as a dedicated storage server configuration.) The replica can be implemented in a variety of ways. In one embodiment of the invention, the replica service endpoint stores data with associated write logs that maintain a sequencing of the actions performed on the disk, and maintains a read index indicating a mapping between logical addresses and physical page storage. The replica service endpoint also manages snapshots of the replica to maintain the status of the volume at the time the snapshot was initiated.

The service control system monitors the health and availability of microcontrollers and replicas, and performs operations, such as creating new microcontrollers and replicas, to recover from errors.

Because each replica service endpoint independently manages its replica data, the replica service endpoints may be individually configured or updated without requiring downtime or modification of other systems. In addition, as the replica data path flows from the storage microcontroller to the replica service endpoints the storage for the replicas may be effectively distributed across a great number of computing hosts without additional complexity of a centralized controller. Because these various storage systems are distributed and not centralized through one controller, the volumes are logically separated from one another and when a storage microcontroller or replica service endpoint fails, it affects only those systems, rather than the entire environment of computing hosts. In addition, when the service control system is unavailable, the storage microcontroller may continue to read and write data to the individual replica service endpoints, even though the system will not be able to create new microcontrollers and replicas or recover from errors.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
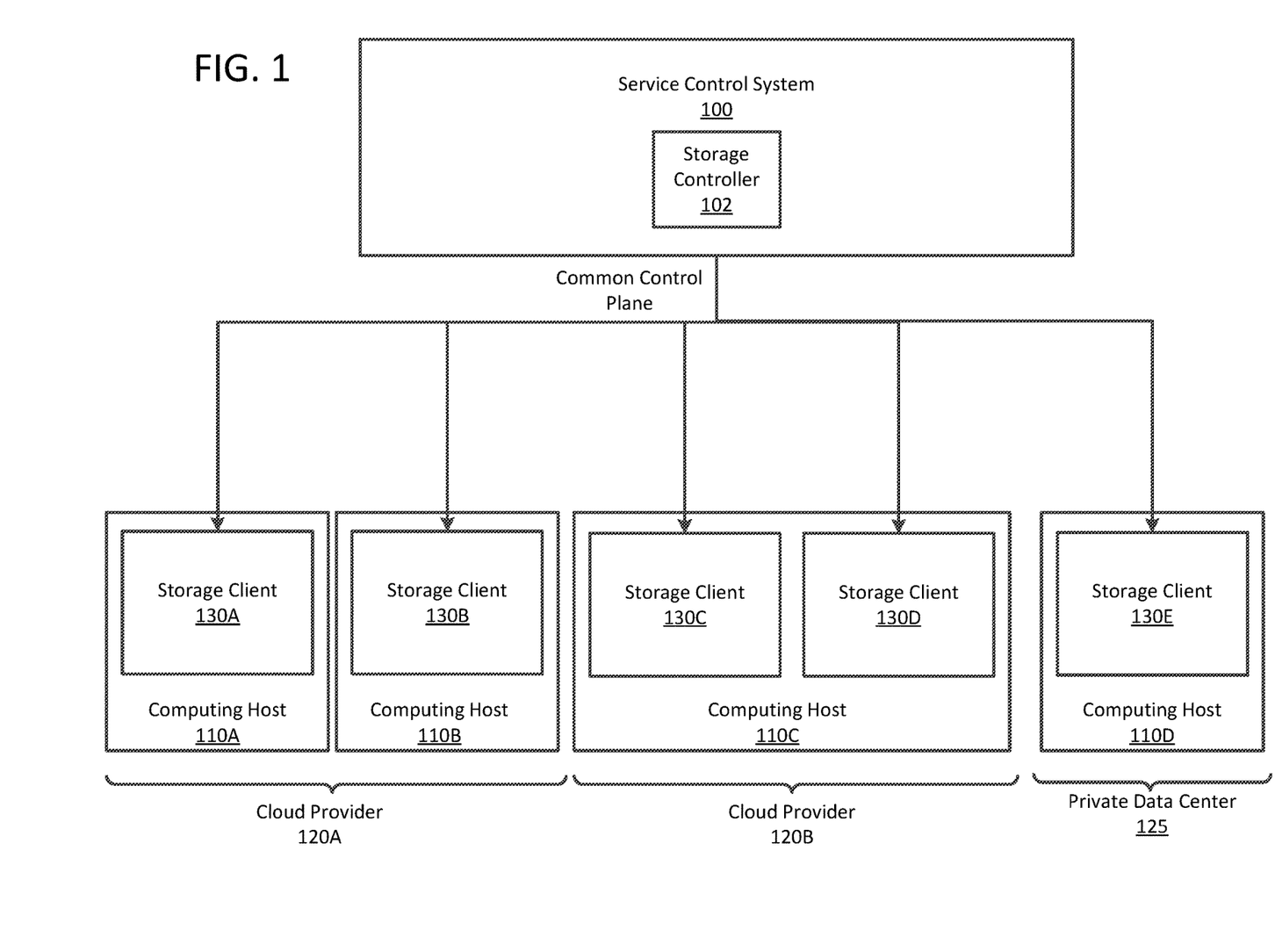
FIG. 1 shows an example environment for controlling services of application containers that may be distributed at several computing hosts.

FIG. 1 shows an example computing environment for controlling application containers that may be distributed at several computing hosts. A service control system 100 provides various services, such as storage for a plurality of storage clients 130A-E (generally storage client 130) at the various computing hosts 110A-D (generally computing host 110). The service control system 100 organizes the storage service across the various storage clients 130. The service control system implements the management and control functions to ensure the proper functioning of storage for the storage clients.

A storage client may be any environment operating on the computing host 110 that consumes storage resources that may be managed by the service control system 100. For example, the storage client 130 may be a container or a virtual machine operating on the computing host 110. A container is a standardized application package format for the code required to form an application. A container provides a standardized runtime environment for running applications on computing hosts. A container provides a standardized runtime environment by logically separating the container from other containers operating on the same computing host, and by providing each container with its own logically separate CPU, memory, storage, and networking resources. Storage clients 130 may also be virtual machines that simulate an operating system and operating system services to processes an applications operating within the virtual machine. The storage clients 130 may reside on many computing hosts 110 provisioned by different cloud providers 120, permitting various application to be executed on many different computing hosts 110 and include storage managed by the service control system 100.

As further described below, each computing host 110 provides logical computing resources in which a container 130 operates, such as CPU, memory, storage, and networking. A computing host may be a physical server system, or may itself be a virtual machine (e.g., in cases where the storage client 130 is a container). In general, multiple cloud providers 120 may provide computing hosts 110. For example, a given cloud computing provider may provide one or more computing hosts for use by a client. In the example shown by FIG. 1, cloud provider 120A provides two computing hosts 110A, 110B each including containers 130A and 130B respectively. Cloud provider 120B provides one computing host 110C in this example, which includes two containers 130C and 130D. In addition, a private data center 125 may provide physical or virtual machines separate from each cloud provider 120A and 120B. The private data center 125 represents a specific machine, such as a server stored at the client's facility.

The service control system 100 provides services to the containers 130 at these various providers via various components of the service control system 100, including a storage controller. The functions of the storage controller are further described below. The service control system 100 communicates with the various containers 130 via a network. In additional embodiments, the service control system 100 may provide additional services to the computing hosts.

In operation, each computing host 110 is accessible via a networking address on the network, which may be unique to each computing host 110. Each storage client 130 may also be assigned a unique networking address on an overlay network maintained by the service control system 100, permitting each storage client 130 to be individually addressable via the overlay network, even when located at another computing host 110 or in a separate cloud provider 120. For example, storage client 130A on computing host 110A may direct a message via the overlay network to storage client 130D on computing host 110C at the overlay network address of storage client 130D. The computing host 110 may also include some local storage at the computing machine 110. Storage services for a storage client 130 are controlled by the storage controller 102, and may include providing a volume accessible to the storage client 130 for storing and maintaining data related to execution of applications within the storage client 130.

The service control system 100 manages these storage services in conjunction with storage microcontrollers at the computing hosts 120.

Figure 2:
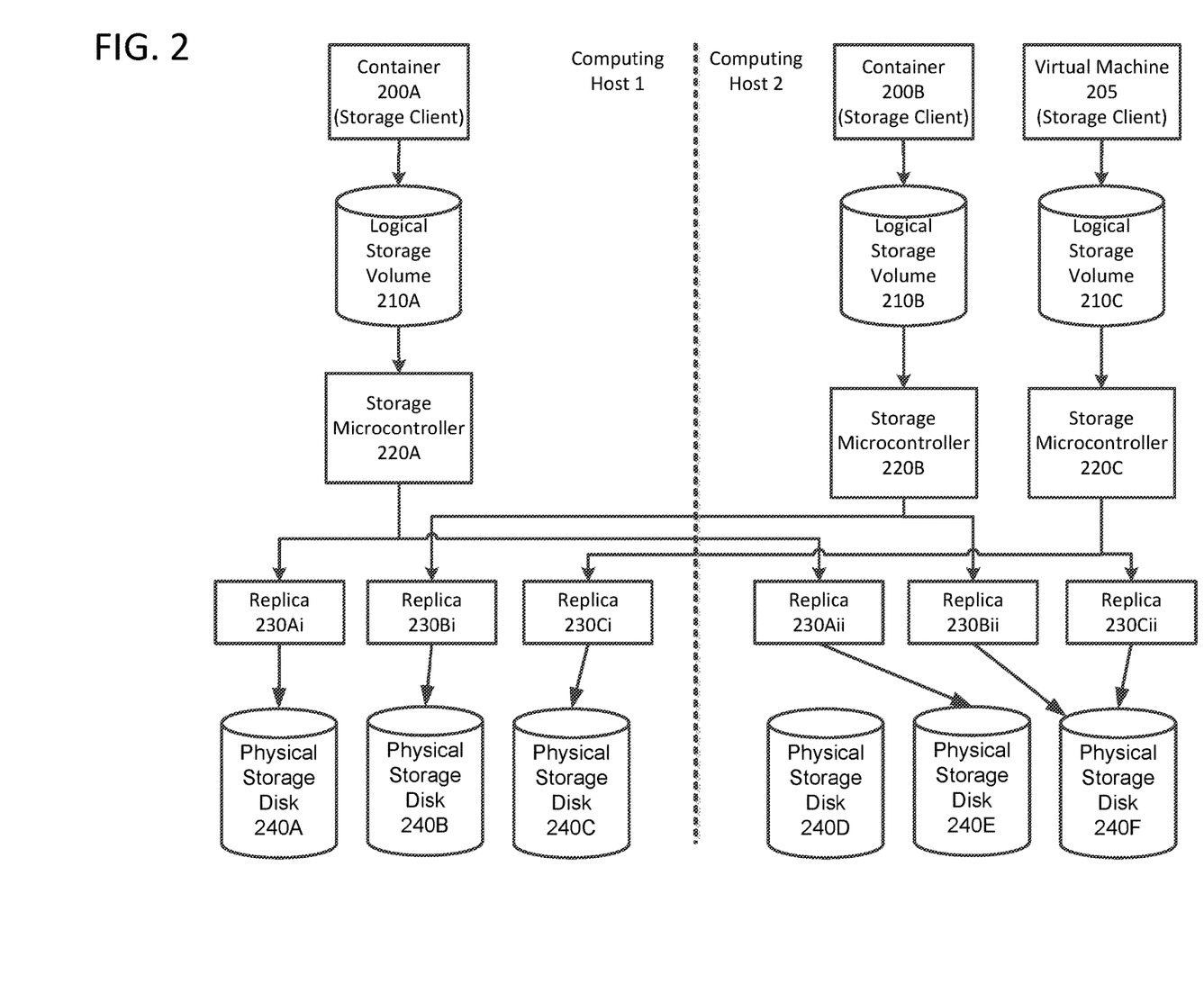
FIG. 2 shows an example storage configuration for a distributed environment of storage clients including containers and virtual machines.

FIG. 2 shows an example storage configuration for a distributed environment of storage clients including containers and virtual machines. Such an example distributed environment is shown in FIG. 1. As shown in FIG. 2, separate containers 200A & B and physical storage disks 240 operate in different computing hosts. While FIG. 2 shows two computing hosts, many more computing hosts may be used in practice to provide storage to a large number of computing hosts and associated storage clients. Each storage client, such as container 200 and virtual machine 205, operating on the computing hosts may have an associated logical storage volume 210. While a single storage volume is shown here for each storage client, in practice each storage client may have any number of logical storage volumes 210. Each logical storage volume 210 may be mounted by the storage client and provide read and write access to the data of the logical storage volume.

For each of these logical storage volumes 210 at a computing host, a storage microcontroller 220 provides access to the volume data. That is, each logical storage volume 210 is associated with one storage microcontroller 220. A storage microcontroller 220 is a process, such as a daemon, running on the same host as the virtual machine or container using the storage microcontroller. Each storage microcontroller processes requests to the logical storage volume with associated replicas 230. As shown here, each storage microcontroller manages two replicas, each of which mirrors the data of the logical storage volume to provide data failover. Each replica for a volume is located at a different computing host, to provide additional protection against individual host compromise. For example, as shown in FIG. 2, the virtual machine 205 has an associated logical storage volume 210C that has requests handled by storage microcontroller 220C. Storage microcontroller 220C maintains two replicas of the logical storage volume 210C, one replica 230Cii on the same computing host, and another replica 230Ci on another computing host. As discussed in FIG. 3, each replica is managed by a replica service endpoint, which selects and manages pages of physical storage for the replicas 230 at physical storage disks 240.

By managing control of data storage by each storage microcontroller but storing the data in a distributed way, no centralized controller is required for the data path. As a result, failure of individual components, such as the storage microcontroller 220, replicas 230, the physical storage disks 240 affect only that logical storage volume 210. Because the data is replicated, failure of one replica can permit the storage microcontroller to recreate a new replica from the remaining replica(s) of the logical storage volume.

Figure 3:
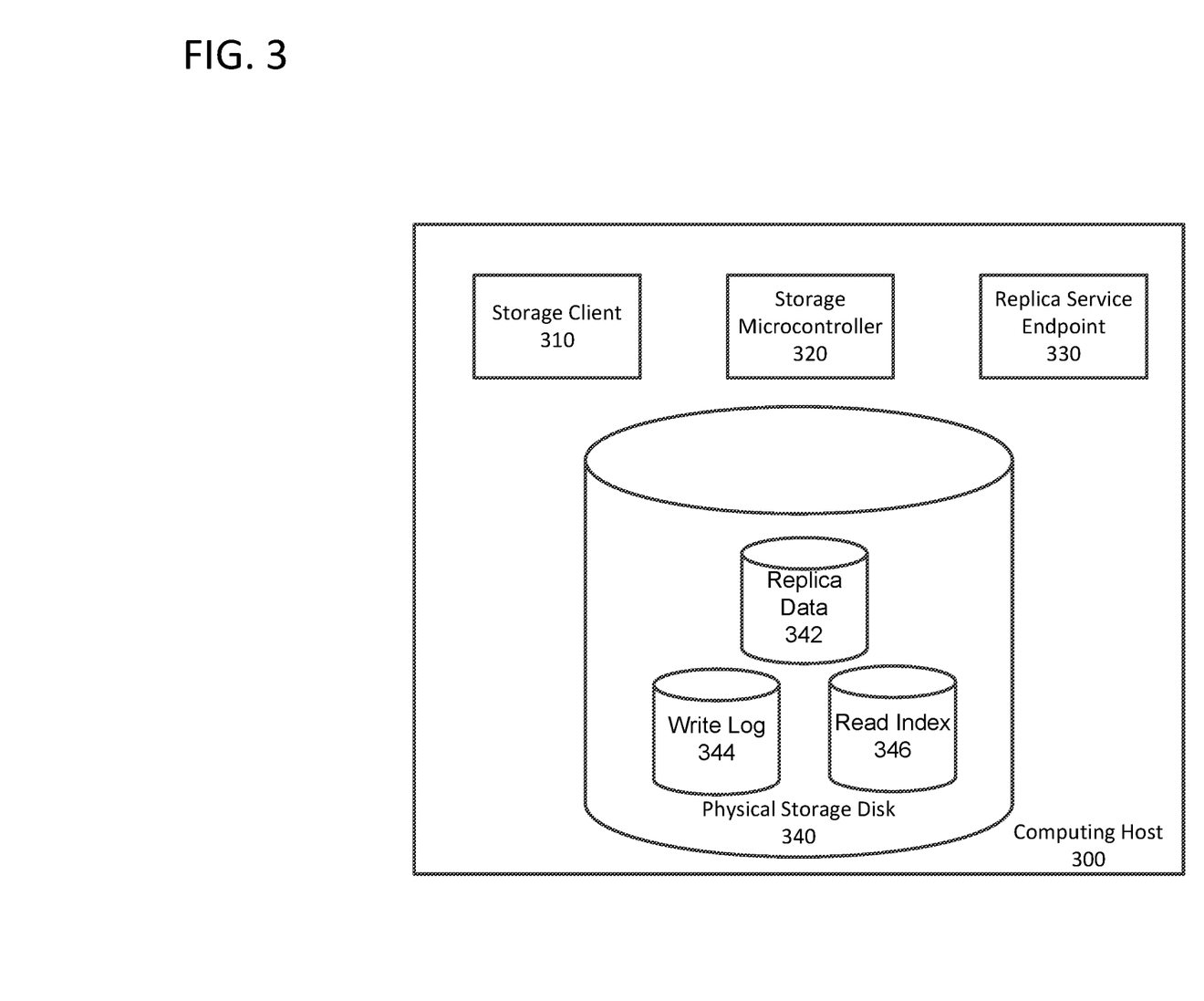
FIG. 3 shows storage-related components executing on a computing host according to one embodiment.

FIG. 3 shows storage-related components executing on a computing host 300 according to one embodiment. These storage-related components may co-exist with storage clients, applications and services provided by computing host 300. The storage-related components include a container 310 that accesses one or more volumes through one or more storage microcontrollers 320. The storage microcontroller 320 accesses replicas of the volume through replica service endpoint 330, which accesses physical storage disk 340. As shown in FIG. 2, the storage microcontroller 320 may access replica service endpoints 330 at a different computing host 300, and in some examples the replicas for the volume are not stored at the same computing host 300 (i.e., no replica data is on the same computing host as the requesting storage microcontroller).

Storage microcontroller 320 provides a mirrored volume configuration across two or more replicas, handles network disconnection and failover, and adds additional replicas for an active set of replicas when a replica is unavailable or degraded. The storage microcontroller 320 treats the replicas as independent services. As the microcontroller issues read/write calls to each replica service endpoint 330, it directs requests to logical blocks on the storage volume, and may not have information relating to how the data is laid out on disk, or whether each replica follows the same on-disk format. Accordingly, the replica service endpoint 330 and underlying data on the physical storage disk may be changed without affecting the storage microcontroller 320.

Each replica service endpoint 330 is a module operating on the computing host that supports a set of operations from the storage microcontroller, such as write, read, take snapshot, list snapshots, remove snapshot, and so forth. The replica service endpoint 330 receives these requests from the storage microcontroller, which may further include data, e.g., for a write request and a specified set of logical block addresses for the operation. In performing these operations, the replica service endpoint 330 maintains and stores data to the physical storage disk 340. The replica data 342 represents the stored data for the replica, which may also be associated with a write log 344. The write log 344 stores a sequenced list of actions performed on the replica data 342, for example indicating that sequence number 1 was a write at page 5 for logical block address 4x238c. The write log 344 may be separate from the replica data 342, or in some cases may be a journal or other metadata stored with the replica data 342. A read index 346 provides an index that maps logical block addresses to physical storage locations on the physical storage disk 340. Though represented here as a portion of the physical storage disk 340, in many implementations the read index 340 is maintained and updated in memory of the replica service endpoint 330, and can be rebuilt based on the sequence list of actions in the write log 344. The various operations of the replica service endpoint 330 on the physical storage disk are further described with respect to FIGS. 4A-9E.

In examples where the write log 344 is stored with the replica data 342, the replica service endpoint 330 may implement a log-structured storage system. When changes are made to the replica, the write log 344 of the change is stored with the changed data itself, rather than as a separate portion of data storage. As noted above, the write log maintains a sequenced list of actions, which ensures changes are recorded in a chronologically correct order. In some examples, the replica service endpoint 330 also stores data in a transactional (i.e., atomic or "crash-consistent") way to ensure consistency in case of power loss. Because the data may be stored for the replica with respect to its changes, rather than as a set of conventional files and directories, the replica may more efficiently store data relative to these conventional storage techniques.

The storage controller 102 on service control system 100 as shown in FIG. 1, manages the assignment of replicas to storage microcontrollers and associated storage disks for each replica. The storage controller 102 may use a global schedule algorithm to distribute the replicas across various computing hosts and manage load across different hosts and physical storage disks.

The service control system thus handles replica allocations, alerts, errors, replication and other control operations for storage. When a new volume is created, for example to be mounted and provide storage for a newly-instantiated storage client 310, the storage controller 102 identifies computing hosts with available storage capacity to provide replicas to the volume, and initiates creation of replica service endpoints 330 with the identified computing hosts to service the requests from a storage microcontroller 320. The storage controller 102 provides an address of the replica service endpoints to the storage microcontroller 320 for the new volume, which begins to add data to the new replicas.

As another example interaction between the storage microcontroller 320 and the storage controller 102, the storage microcontroller 320 may request a new replica when a current replica for the volume has degraded. When the current replica is degraded, the storage microcontroller 320 may use the remaining replica until an additional replica has been added to the current set. The storage microcontroller 320 also provides an alert to the storage controller 102. The storage controller 102 receives the alert and records the degraded state of the degraded replica. The storage controller 102 also determines another physical storage disk 340 (which may be located on another computing host 300 from the degraded replica) and allocates the physical storage disk 340 for the volume, creating a new replica. The storage microcontroller 320 receives the new replica and begins to copy data from the surviving replica to the new replica. When the data has been fully copied to the new replica, the new replica is added to the current replica set for the volume, and the degraded replica can be fully removed.

FIGS. 4A-4E illustrate various example storage operations performed on the physical storage disk for a replica of a volume. Each example storage operation in FIGS. 4A-9E are performed relative to the previous Figure (i.e., FIG. 4B follows FIG. 4A, FIG. 4C follows FIG. 4B, etc.). In the example shown here, the replica data is stored in a set of "slabs." Each slab is a sparse file storing individual pages of data, which may be a uniform size. In one embodiment, each page is 64 KB or larger, and hold multiple contiguous disk blocks. In an embodiment where the data comprises a log-structured storage, each page may store the replica data along with the write log indicating its logical block address and sequence number. In other examples, the write log separately stores the logical block address and related slab and page for the logical block address.

Figure 4A:
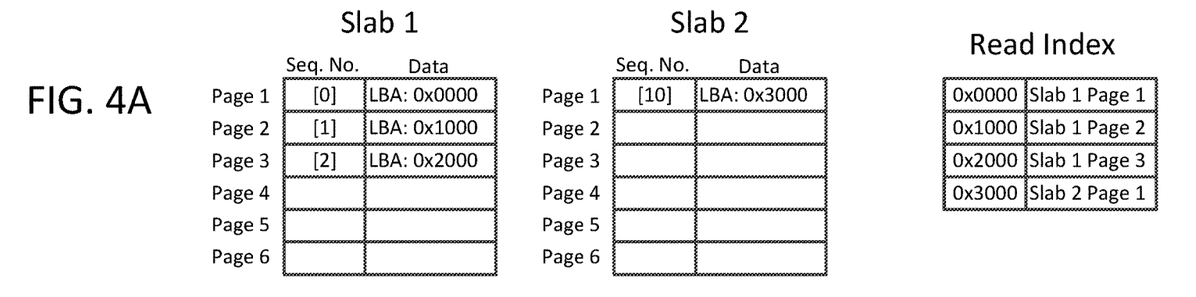
FIGS. 4A-4E illustrate various example storage operations performed on the physical storage disk for a replica of a volume.

FIG. 4A shows an initial state of two example slabs, each having six pages. In this example, logical block addresses (LBA) 0x0000, 0x1000, 0x2000 and 0x3000 have been stored on slabs 1 and 2 as shown. In this example, the sequence numbers 0, 1, and 2 are allocated to writes of LBA 0x0000 0x1000 and 0x2000 on pages 1-3 of Slab 1, and sequence number 10 corresponds to LBA 0x3000 stored on slab 2. The read index is initialized by the replica service endpoint 830 by sequentially adding each sequence number to the read index. As discussed further below, when data for a given sequence number is no longer needed, the sequence number is removed, such that the removed actions from those sequences are not included in the read index. By analyzing the write log 344 by the sequence numbers, the read index 346 may be built to account for any snapshots and other adjustments to the logical block addresses before and after a snapshot. Thus, initializing the read index treats the actions in the write log as though they had recently occurred.

Figure 4B:
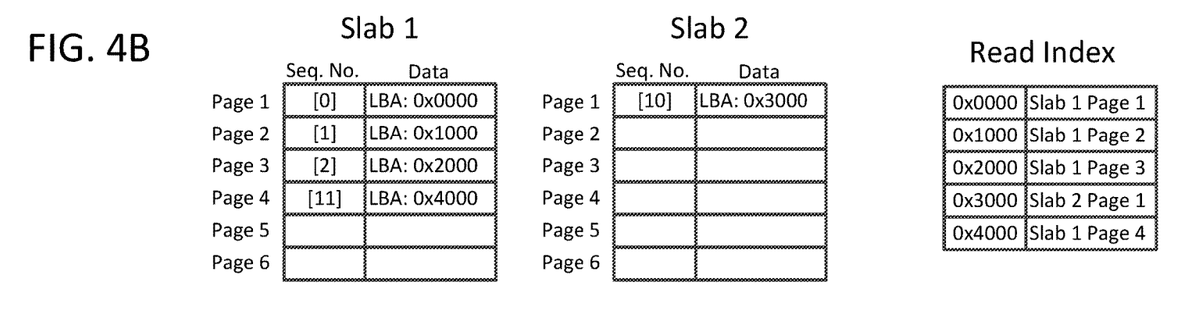

To read data, the replica service endpoint 330 accesses the read index 346 to identify the associated slab and page of the requested logical block addresses. To write data, the replica service endpoint 330 determines whether the logical block addresses for the write operation have previous data. If the logical block addresses have not previously been written, a new page is selected and the data written to the new page, and the read index 346 is updated. When a page currently stores the logical block address, the replica service endpoint 330 determines whether to add the data to a new page or replace the existing page for the data. This determination may be based on whether it would be more efficient to perform either operation. However, if the logical block address is part of a snapshot, then a new page is written to denote data that is "live" after the snapshot. FIG. 4B illustrates a write operation for LBA 0x4000. As shown, this LBA does not previously have a mapping in the stored data, and instead a new page is created in slab 1, and the write operation is associated with a new sequence number, sequence number 11.

Figure 4C:
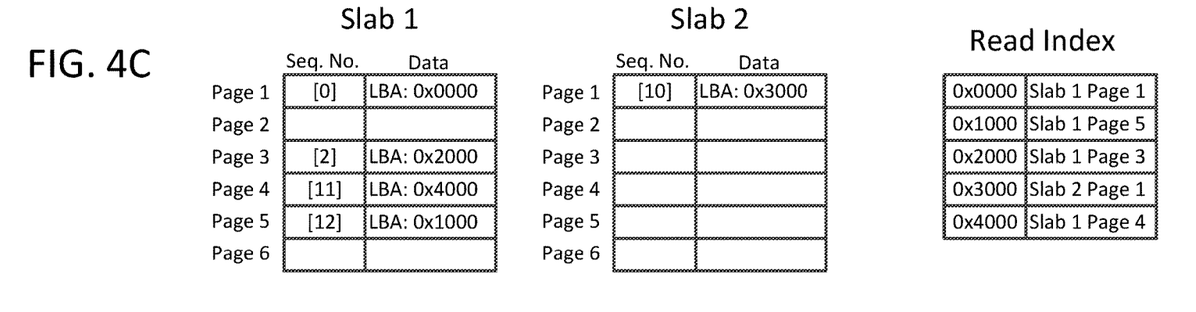

FIG. 4C illustrates the modification of an existing LBA. In this example, the request modifies LBA 0x1000. Because LBA 0x1000 is already stored in page 2 on slab 1, the new LBA 0x1000 may be written to either a new page or the prior physical address. In this example, the data is stored in a new page, page 5 on slab 1, with the next sequence number of 12. The read index is also updated to indicate the new location for 0x1000 is slab 1 page 5. The prior location of LBA 0x1000 (at page 2) is removed, so that the page is available for reuse and the prior sequence number is no longer necessary (as the prior data is no longer referenced or part of a snapshot).

Figure 4D:
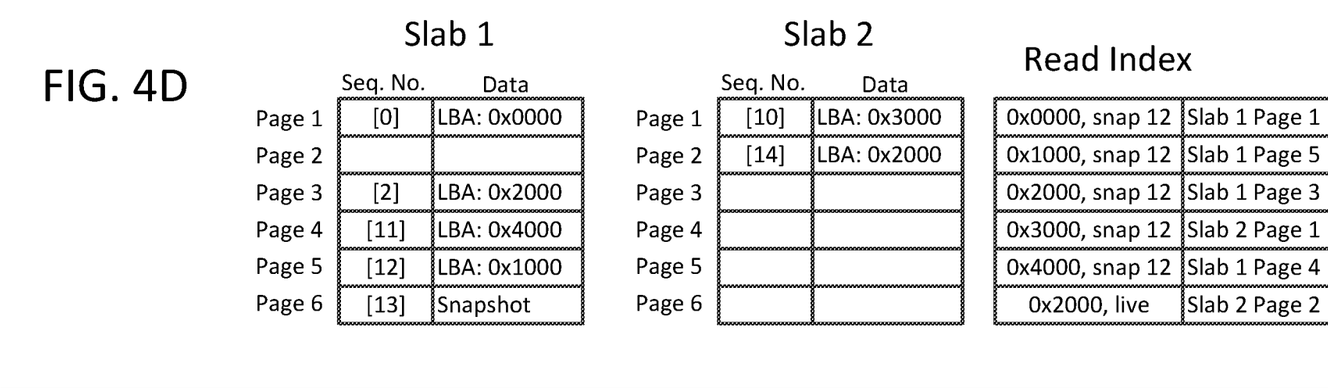

FIG. 4D shows the addition of a snapshot. In this example, the snapshot is indicated by a "snapshot" action with an associated sequence number. In FIG. 4D, a snapshot is added with sequence number 13. That is, in this example the snapshot is indicated by a special type of page or entry in the write log. A snapshot is a recoverable version of the replica as it existed at the time the snapshot was taken. To indicate the state of the replica at the time of the snapshot, the contents of the read index are updated to indicate that the current LBA to physical mappings are associated with a specific snapshot. This permits the read index to represent the multiple "generations" of data from multiple snapshots. In this example, the LBA addresses for 0x0000 through 0x4000 are indicated as part of a snapshot.

In addition, FIG. 4D also shows a modification of LBA 0x2000 after the snapshot was taken. As shown, since the data related to the snapshot cannot be edited, the new data is recorded to a new page: slab 2, page 2. In this way, the snapshot "pins" the current data associated with the stored snapshot. The recorded LBA is noted in the read index as relating to the "live" version, which is not associated with a snapshot. When the recorded LBA has already been associated with the "live" data, the "live" data may be normally edited. I.e., another modification to LBA 0x2000 could replace sequence number 14, at another page or at that page.

Because each of the entries is associated with a sequence number, even though there are two entries relating to LBA 0x2000, the read index can be reconstructed (such as during initialization). The status of the read index can be rebuild by adding information to the read index in sequential order according to the sequence numbers of remaining pages in the write log. In this example, if the read index needed to be result, sequence number 0 and 2 would be added, followed by 10-14. As when the snapshot was originally taken, at the time that the snapshot is processed in rebuilding the read index, the sequence numbers prior to the snapshot would create the same status of the read index as when the snapshot was first made. In this way, the expense to generate a snapshot in the record is very small (i.e., record a snapshot in the write log with an appropriate sequence number).

When a request to read data is received and there is a snapshot present in the read index, the replica service endpoint 330 identifies which entry in the read index corresponds to the requested data. When the request is to read the "live" data, the logical-to-physical look-up is performed on the read index, beginning with the "live" data and then prior snapshots in reverse chronological order. This read operation may traverse the prior snapshots until the LBA has been found. When a read request indicates a snapshot, the read request begins at the specified snapshot and, if the LBA is not found, proceeds in chronological reverse order to prior snapshots.

Figure 4E:
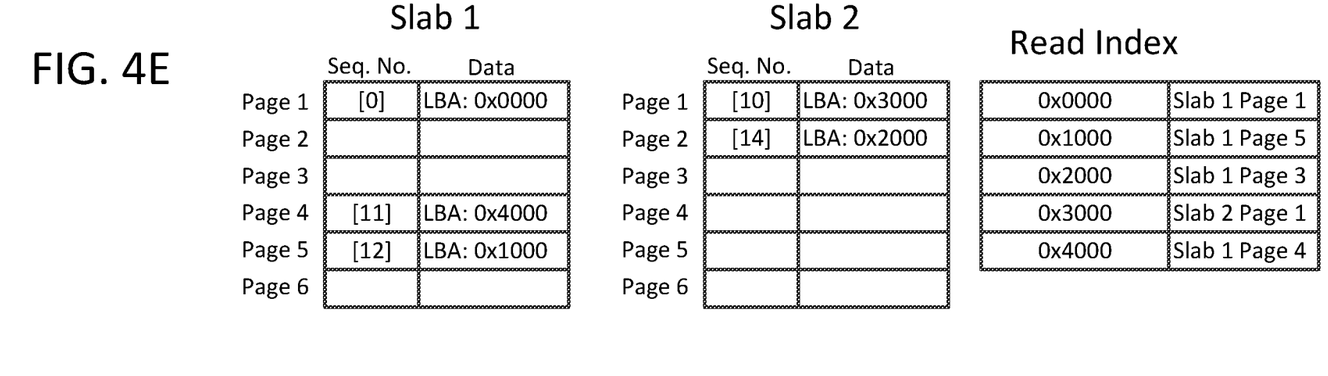

FIG. 4E shows the state of the write logs and read index after a snapshot is deleted. To delete the snapshot, the replica service endpoint 330 determines the LBAs that have been modified in the "live" version, and deletes that LBA from the prior sequence number relating to that snapshot. In this example, LBA 0x2000 was previously recorded at slab 1 page 3 with sequence number 2, and was also written in the "live" version at slab 2 page 2 for sequence number 14. The sequence number for the LBA related to the prior snapshot may thus be removed and the data in slab 1 page 3 is available to be rewritten. After removing any snapshotted LBAs that are now associated with a "live" version, the prior "snapshot" LBAs are considered "live" in the read index. Next, the "snapshot" page is removed, in this case from slab 1 page 6. After removal of the snapshot sequence number, the read index can be quickly reconstructed from the sequence numbers of the remaining write logs. In this example, the When a new replica is created, the replica service endpoint 330 provides data to the new replica from each stored snapshot. Each snapshot may be transmitted to the new replica as a set of new data that changed between the prior snapshot and the next snapshot. Once the new replica has retrieved the prior snapshot data, the current ("live") data is transmitted after the storage microcontroller 820 pauses sending write commands to the replicas. The prior replica generates a final snapshot, and sends the changes to the new replica to permit the new replica to join the active set of replicas for a volume.

Because each snapshot is added to the write log with a sequence number, the replica service endpoint 330 can quickly determine the difference between two snapshots by identifying all sequence numbers (that remain) between the two snapshot sequence numbers. This makes the snapshots of the volumes efficient to perform and easy to manage during heavy write load. In practice, such snapshots are typically temporary, as the volume may be backed up to more permanent storage as discussed with respect to FIG. 5.

Returning to FIG. 1, the storage controller 102 may provide backup and restoration for storage volumes of individual volumes. The storage controller 102 maintains access to a secondary storage, such as another cloud-based storage solution. This secondary storage may be remote from the storage volume of the container being managed by the storage controller 102 and provides a secure location for storing and maintaining backups data in the volumes. The secondary storage may also be restored to another storage client 130 to provide the data that was backed up to the same application executing in another storage client 130 or computing host 110.

Figure 5:
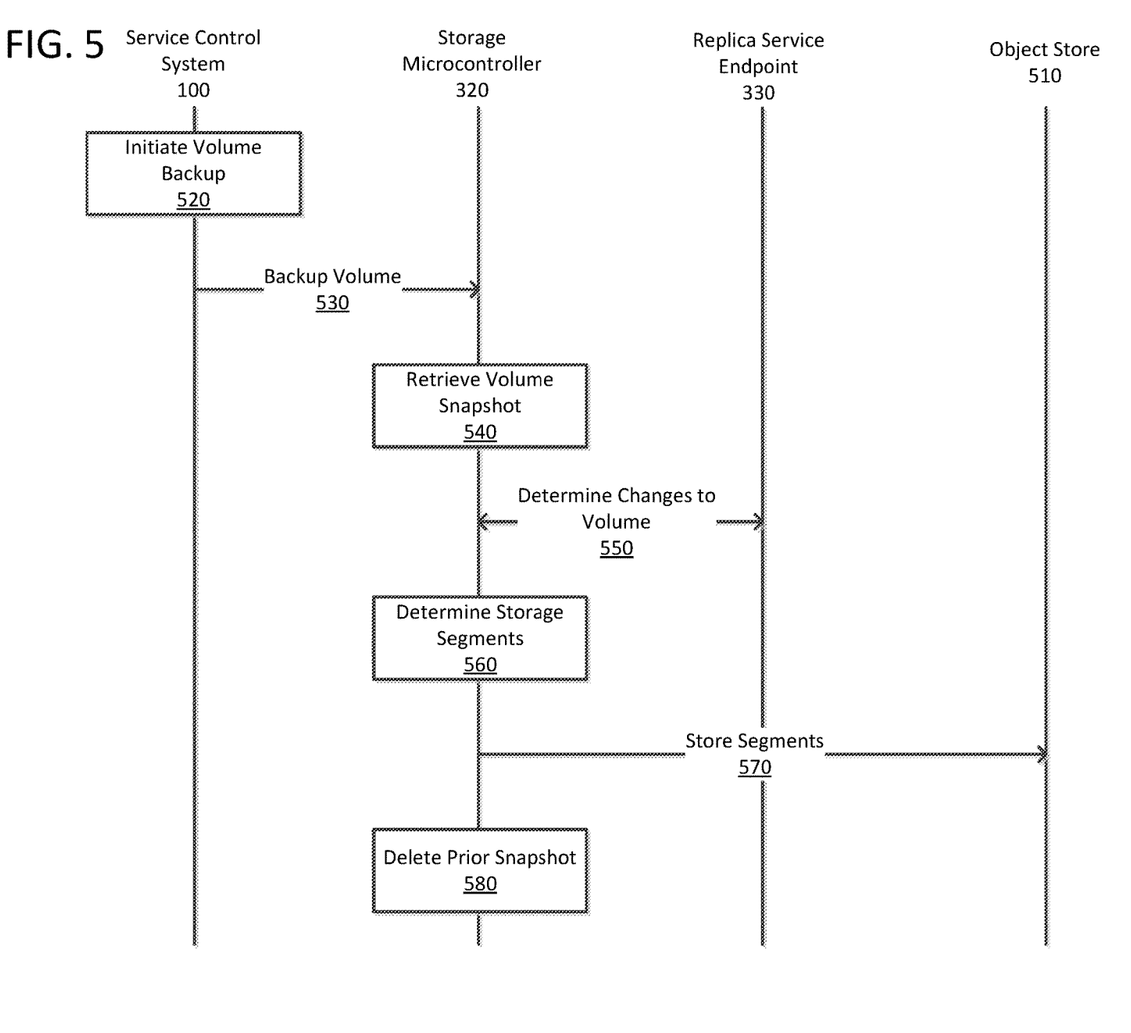
FIG. 5 shows an interaction diagram for a backup of a volume to an object store according to one embodiment.

FIG. 5 shows an interaction diagram for an algorithm for a backup of a logical storage volume to an object store according to one embodiment, performed by the storage microcontroller 320. In this example, the object store 510 represents the secondary storage that stores a backup of the volume. In this example, the service control system 100 initiates 520 the volume backup of a logical storage volume managed by a storage microcontroller 320 on a computing device 110. In other embodiments a backup of the volume may be automatically initiated by the storage controller 102 or storage microcontroller 320 at an interval, such as each day or week. In this example, the request to backup a volume is sent 530 by the service control system 100 (such as by the storage controller 102 shown in FIG. 1).

To backup a volume, a volume may be separated into a plurality of segments representing portions of the volume. The segments may be a fixed or variable size. In one embodiment, the segments are 2 megabytes (Mb) in size. The segments may be determined for each backup, and the changes to the storage volume may be represented in the segments, such that each backup incrementally stores additional segments, and may not re-send segments that were part of a previous backup. In this way, each segment may store a portion of the volume, and differences in the volume are identified and sent to the object store 510 via the new segments.

To identify these segments, the storage microcontroller 320 retrieves 540 the volume snapshot of the container 500. The retrieved volume snapshot 540 may itself maintain a separate set of the segments, or may identify the contents of each segment, for example by identifying a path and one or more files in the volume that are associated with the segment. Next, the storage microcontroller 320 accesses the replica service endpoint 330 to determine 550 changes to the volume relative to the volume snapshot. The storage microcontroller 320 determines one or more storage segments 560 that reflect the changes to the volume. In addition, the storage microcontroller 320 may determine one or more segments that are no longer part of the volume. The new storage segments are stored 570 at the object store 510, and segments that are no longer a part of the new volume snapshot may be queued for deletion or garbage collection at the object store 510. In one embodiment, the segments may be encrypted or otherwise stored as a binary file that permits the segments to be stored at the object store 510 without enabling access by another entity to the stored segments. After storing the segments to the object store 510, the storage microcontroller 320 may delete 580 the prior snapshot stored at the control plane agent.

For another container to reconstitute the volume 500 using the object store 510, the service control system 100 identifies the snapshot stored at the object store 510. The segments at the object store 510 associated with that snapshot are retrieved by the storage microcontroller 320 to reconstitute the volume, and the snapshots of the volume stored at the object store 510 are expanded to recreate the volume 500.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for managing distributed storage, comprising:
a plurality of computing hosts distributed across a plurality of different cloud providers, the plurality of computing hosts including:
a plurality of logical storage volumes associated with a plurality of storage clients;
a plurality of storage microcontrollers, each storage microcontroller associated with one logical storage volume, and configured to:
receive storage instructions from the storage clients for the associated logical storage volume; and
send requests to replica service endpoints to store and retrieve data to a plurality of physical storage devices each assigned to store a replica of the logical storage volume based on the storage instructions; and
a plurality of replica service endpoints, each executing at the computing host to manage and store replica data at physical storage disks on the computing host based on requests from a storage microcontroller at a different computing host; and
a service control system including a storage controller that manages storage services and assigns replicas for the plurality of storage microcontrollers based on available capacity at the plurality of computing hosts, the storage services managed using the plurality of microcontrollers at each computing host, wherein each replica mirrors data of one of the logical storage volumes and at least one of the replicas is located at a different computing host than the computing host associated with the logical storage volume.

2. The system for managing distributed storage of claim 1, wherein the plurality of storage clients include a container or a virtual machine.

3. The system for managing distributed storage of claim 1, wherein the service control system selects the plurality of physical storage device for the plurality of storage microcontrollers.

4. The system for managing distributed storage of claim 1, wherein the service control system manages recovery for the logical storage volume.

5. The system for managing distributed storage of claim 1, wherein the storage microcontrollers send requests to replica service endpoints to store and retrieve data to the plurality of physical storage devices without accessing the service control system.

6. A system for managing distributed storage comprising:
a first and a second computing host of a plurality of computing hosts distributed across a plurality of different cloud providers, each computing host including:
a plurality of containers executing on the computing host, the containers providing a runtime environment for applications, each container associated with a logical storage volume, and
a plurality of storage microcontrollers for the logical storage volume, executing on the computing host, each storage microcontroller associated with a container and configured to send requests to manage and store data received from the container to:
a first replica service endpoint executing at a first replica computing host, the first replica service endpoint storing a mirrored copy of at least a portion of the data for the logical storage volume on a physical storage device based on receiving one or more requests from a storage microcontroller; and
a second replica service endpoint executing at a second replica computing host, the second replica service endpoint storing another mirrored copy of at least the portion of the data for the logical storage volume for the logical storage volume on a physical storage device, wherein at least one of the first replica computing host and the second replica computing host is different from the computing host; and
a service control system including a storage controller configured to assign replica computing hosts for the storage microcontrollers of the first and second computing hosts based on available capacity at the computing hosts and to manage storage services and provide control of the first and second computing hosts, the storage services managed using the storage microcontroller, wherein the storage controller manages assignment of replicas to the storage microcontroller.

7. The system of claim 6, wherein the storage microcontroller provides a datapath to the replica service endpoints that does not include the service control system.

8. The system of claim 6, wherein the storage microcontroller writes data to the first and second replica service endpoints without accessing the service control system.

9. The system of claim 6, wherein each replica service endpoint is configured to assign physical storage locations to a logical address provided in the data storage request.

10. The system of claim 6, wherein the first replica computing host is the first or the second computing host.

11. The system of claim 6, wherein the service control system is configured to assign a third replica computing host to a storage microcontroller when the first replica computing host or second replica computing host has degraded and cannot maintain a mirrored copy of the portion of the data for the logical storage volume.

* * * * *